(12) United States Patent
Jonasson et al.

(10) Patent No.: US 12,465,503 B2
(45) Date of Patent: Nov. 11, 2025

(54) PROSTHETIC ATTACHMENT SYSTEM AND CORRESPONDING LOCK ASSEMBLY

(71) Applicant: Ossur Iceland ehf, Reykjavik (IS)

(72) Inventors: Hafsteinn Jonasson, Reykjavik (IS); Sigurdur Hannesson, Reykjavik (IS); Oskar Thor Larusson, Reykjavik (IS); Margret Sol Ragnarsdottir, Reykjavik (IS); Halldor Albertsson, Reykjavik (IS)

(73) Assignee: OSSUR ICELAND EHF, Reykjavik (IS)

( * ) Notice: Subject to any disclaimer, the term of this patent is extended or adjusted under 35 U.S.C. 154(b) by 650 days.

(21) Appl. No.: 17/890,748

(22) Filed: Aug. 18, 2022

(65) Prior Publication Data
US 2023/0058917 A1 Feb. 23, 2023

Related U.S. Application Data

(60) Provisional application No. 63/351,062, filed on Jun. 10, 2022, provisional application No. 63/280,490, filed on Nov. 17, 2021, provisional application No. 63/235,419, filed on Aug. 20, 2021.

(51) Int. Cl.
*A61F 2/78* (2006.01)
*A61F 2/60* (2006.01)
*A61F 2/80* (2006.01)

(52) U.S. Cl.
CPC .............. *A61F 2/7812* (2013.01); *A61F 2/60* (2013.01); *A61F 2/80* (2013.01); *A61F 2002/7875* (2013.01)

(58) Field of Classification Search
CPC .. A61F 2/7812; A61F 2/80; A61F 2002/7875; A61F 2002/7831
See application file for complete search history.

(56) References Cited

U.S. PATENT DOCUMENTS

| 4,923,474 | A | 5/1990 | Klasson et al. |
| 6,136,039 | A | 10/2000 | Kristinsson et al. |
| 6,334,876 | B1 * | 1/2002 | Perkins ............... A61F 2/80 623/34 |
| 6,485,776 | B2 | 11/2002 | Janusson et al. |
| 6,793,682 | B1 | 9/2004 | Mantelmacher |

(Continued)

OTHER PUBLICATIONS

Ossur, Icelock 562 Hybrid, Instruction Manual, 2019, pp. 1-17, Reykjavik, Iceland.

(Continued)

*Primary Examiner* — Bruce E Snow
(74) *Attorney, Agent, or Firm* — Workman Nydegger

(57) ABSTRACT

A prosthetic attachment system and corresponding lock assembly are provided for connecting a distal end of a prosthetic liner to a distal end of a prosthetic socket, by combining vacuum suspension and mechanical suspension. An attachment pin extends from a distal end of the prosthetic liner. A connector assembly secures to a distal end of the prosthetic socket and is adapted for receiving and locking to the attachment pin. A lanyard assembly has a first end secured to the connector assembly and a second end extending outwardly from the distal end of the prosthetic socket and adapted to secure to an exterior surface of the prosthetic socket by an external securing system.

14 Claims, 13 Drawing Sheets

(56) References Cited

U.S. PATENT DOCUMENTS

| | | | |
|---|---|---|---|
| 6,797,008 B1 | 9/2004 | Arbogast et al. | |
| 7,431,738 B2 | 10/2008 | Perkins et al. | |
| 7,727,284 B2* | 6/2010 | Warila | A61F 2/80 623/36 |
| 7,762,973 B2 | 7/2010 | Einarsson et al. | |
| 7,771,487 B2 | 8/2010 | Mantelmacher | |
| 7,842,099 B2 | 11/2010 | Mantelmacher | |
| 7,850,739 B2 | 12/2010 | Perkins et al. | |
| 7,883,547 B2 | 2/2011 | Mantelmacher | |
| 7,927,377 B2* | 4/2011 | Slemker | A61F 2/78 623/34 |
| 8,034,120 B2 | 10/2011 | Egilsson et al. | |
| 8,057,551 B2 | 11/2011 | Slemker et al. | |
| 8,409,298 B2* | 4/2013 | Perkins | A61F 2/78 623/36 |
| 9,693,884 B1 | 7/2017 | Morgan et al. | |
| 9,987,150 B2 | 6/2018 | Bremer | |
| 10,398,577 B2 | 9/2019 | Dillingham | |
| 10,537,458 B2 | 1/2020 | Omarsson et al. | |
| 10,603,192 B2 | 3/2020 | Muller | |
| 10,945,865 B2 | 3/2021 | Hringsdottir et al. | |
| 2004/0143345 A1 | 7/2004 | Caspers | |
| 2005/0209706 A1 | 9/2005 | Warila | |
| 2007/0078523 A1 | 4/2007 | Kholwadwala et al. | |
| 2010/0198361 A1 | 8/2010 | Warila | |
| 2016/0158035 A1 | 6/2016 | Alley | |
| 2016/0338858 A1 | 11/2016 | Hurley et al. | |
| 2017/0151072 A1 | 6/2017 | Mahon et al. | |
| 2017/0231788 A1 | 8/2017 | Kelley et al. | |
| 2017/0333225 A1 | 11/2017 | Cheng et al. | |
| 2018/0008435 A1* | 1/2018 | Mantelmacher | A61F 2/78 |
| 2019/0083285 A1 | 3/2019 | Hillmann et al. | |
| 2020/0345521 A1 | 11/2020 | Mahon et al. | |
| 2023/0058917 A1* | 2/2023 | Jonasson | A61F 2/60 |

OTHER PUBLICATIONS

Ossur, Direct Socket TT, Instruction Manual, 2021, pp. 1-12, Reykjavik, Iceland.

International Search Report from PCT Application No. PCT/US2022/040711, Nov. 21, 2022.

\* cited by examiner

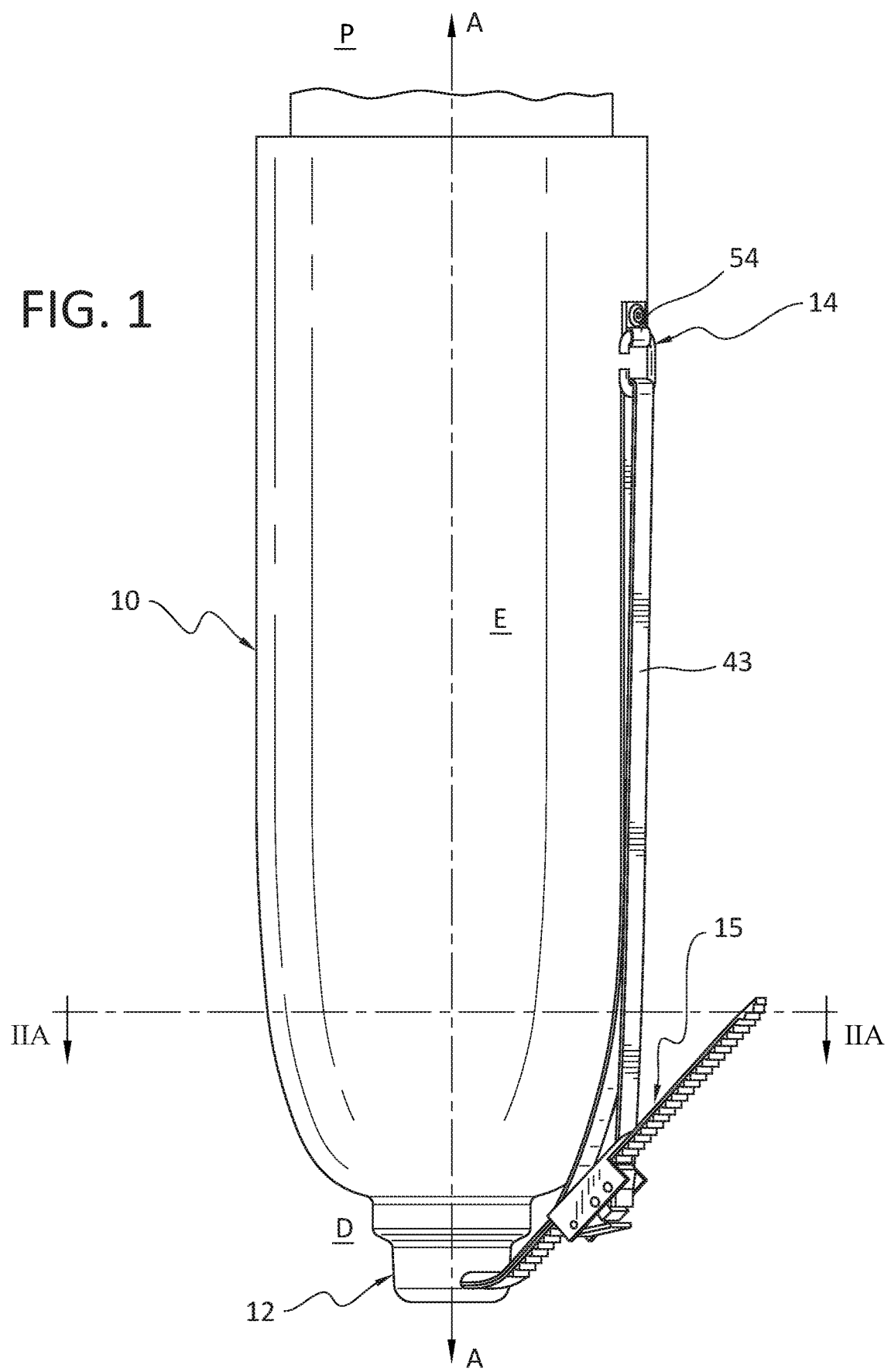

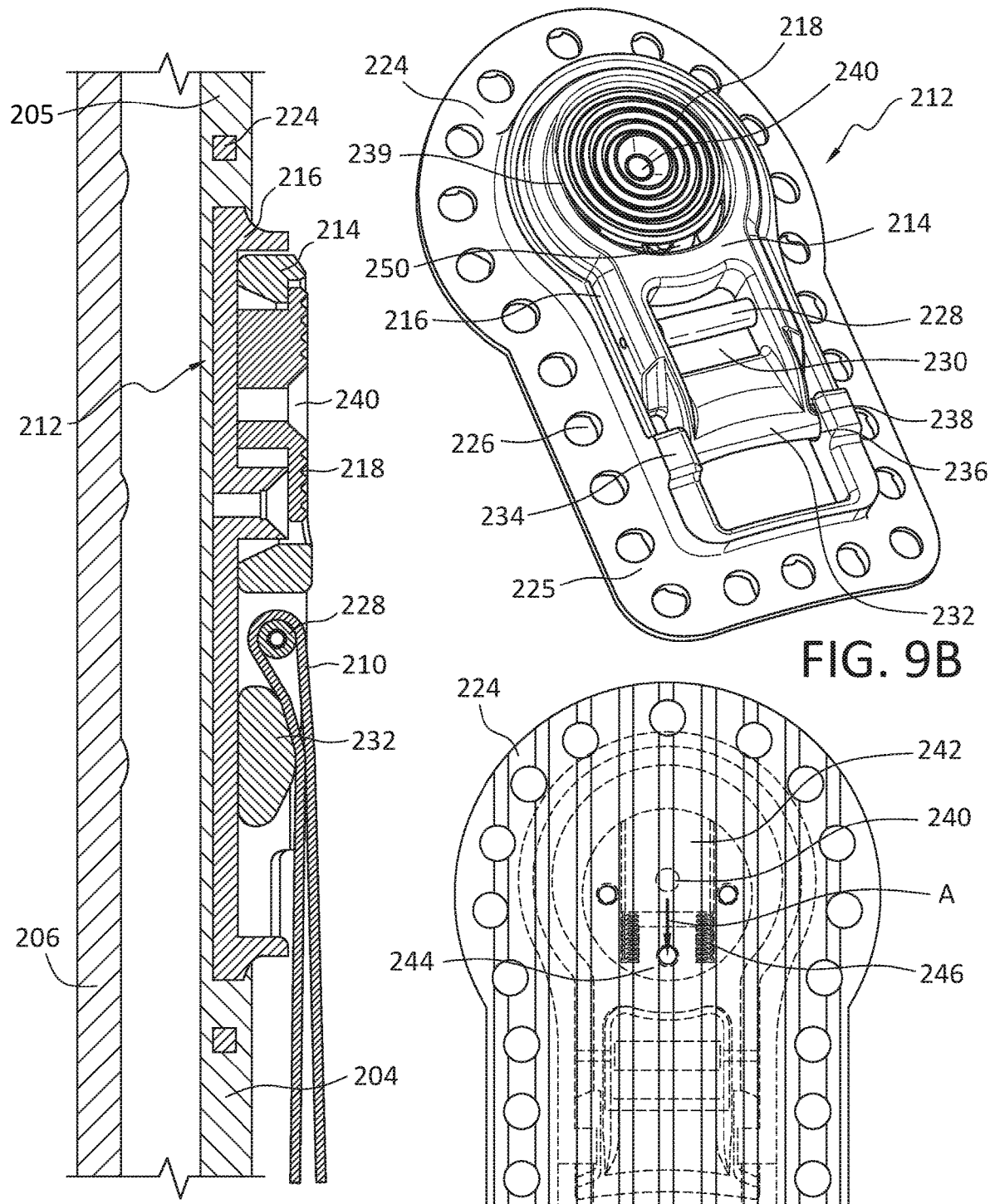

PROSTHETIC ATTACHMENT SYSTEM AND CORRESPONDING LOCK ASSEMBLY

TECHNICAL FIELD

This disclosure is directed to a prosthetic attachment system, particularly a lock assembly for locking a prosthetic liner to a prosthetic socket.

BACKGROUND

A typical prosthetic leg and foot include a socket, pylon, and foot. A socket is the portion of a prosthesis that fits around and envelops a residual limb or stump and to which prosthetic components, such as a foot, are attached. The socket must fit closely to the residual limb to provide a firm connection and support but must also be sufficiently loose to allow for circulation. Combined with proper fitting, the socket comfortably transfers loads from the residual limb to the ground.

To increase comfort, a prosthetic liner is arranged as an interface between the socket and the residual limb. Generally, the prosthetic liner includes an elastomeric body having a closed distal end and an open proximal end pulled or rolled over the residual limb. The prosthetic liner adheres to the residual limb surface. It acts as an interface between the residual limb and the socket by extending between and facilitating contact between the residual limb and the rigid components of the socket.

Different mechanisms exist for holding the socket on the residual limb during the prosthesis use. For instance, locking pin-type systems provide an attachment pin at the closed distal end of the prosthetic liner that engages a prosthetic-system lock assembly at the distal end of the socket. The lock assembly is connected to the components, such as the pylon, connecting to the foot and effectively couples the liner, the socket, and the components together. In addition, an unlocking mechanism can release the attachment of the prosthetic liner to the socket.

A problem inherent in conventional locking pin-type systems is that they incorrectly lock if a user does not properly insert the attachment pin in the lock assembly. This problem can cause the failure of the lock assembly during use and significant injury to the user. In addition, too much free play between the attachment pin and the lock assembly can cause a slack connection so that the residual limb undesirably moves up and down within the socket when the user is walking, an undesirable phenomenon known as "pistoning." The free play may also lead to premature wear of the attachment pin and lock components, which can cause a lock failure.

Conventional lock assemblies also make donning and doffing of the residual limb in the socket problematic. This problem is especially evident for elderly users and others who have difficulty properly aligning the attachment pin in the lock assembly due to limited cognition, dexterity, or poor eyesight. Donning a prosthesis may be frustrating for older users who lack sufficient strength to align and secure a donned liner to a socket. In addition, these prosthetic attachment systems may require the user to stand during donning and means for firmly securing the prosthetic socket and prosthetic liner to one another.

There is a need for a prosthetic attachment system that makes donning and doffing prosthetic sockets easier and more intuitive, minimizes pistoning, and prevents incorrect locking of the system. Yet further, there is a need for a prosthetic attachment system that simplifies the donning process and accounts for users with poor strength and dexterity.

SUMMARY

The disclosure describes various embodiments of a prosthetic attachment system, including a lock assembly for a prosthetic system, providing construction and design that facilitates a more intuitive and secure connection between a residual limb and a prosthetic socket.

The prosthetic attachment system provides a lock assembly that combines high or passive vacuum and locking suspension simultaneously. It may be directed to transfemoral amputees in the Low Active segment, mainly geriatrics and users with vascular disease. In addition, the prosthetic attachment system may benefit lower limb amputees (Low Active or High Active) currently using mechanical locking.

The prosthetic attachment system and corresponding lock assembly are provided to combine vacuum suspension and mechanical suspension. A sealing type suspension liner achieves the vacuum suspension, and the mechanical locking may be provided at least in part by a lanyard and strap means adjustably securing to an exterior of the prosthetic socket.

In a preferred embodiment, the lock assembly is arranged for a prosthetic socket system and is adapted to couple a prosthetic liner to a prosthetic socket. The lock assembly includes an attachment pin extending from a distal end of the prosthetic liner. A connector assembly is secured by a distal end of the prosthetic socket and adapted for receiving and locking the attachment pin. A lanyard assembly has a first end secured to the connector assembly and a second end extending outwardly from the distal end of the socket and adapted to secure to an exterior surface of the prosthetic socket by an external securing system.

Glossary

The terms set forth below will have the meanings as defined:

The term "anterior" has its ordinary meaning and refers to a location ahead of or to the front of another. The term "posterior" also has its ordinary meaning and refers to a location behind or to another location's rear.

The term "distal" has its ordinary meaning and refers to a location that is further from the heart than another location. The term "proximal" also has its ordinary meaning and refers to a location that is closer to the heart than another location.

The term "elongate" may generally denote that an element of the prosthetic attachment system is longer than it is wide.

The terms "flexible," "resilient," and "rigid" may be used herein to distinguish characteristics of portions of certain features of the prosthetic system. The term "flexible" is intended to denote that features are capable of repeated bending such that the features may be bent into retained shapes or the features do not retain a general shape, but continuously deform when force is applied. The term "resilient" is used to qualify such flexible features as generally returning to an initial general shape without permanent deformation. The term "rigid" denotes that an element of the system is generally devoid of flexibility.

The term "generally is meant to connote "mostly" or "near exactly," but not necessarily exactly.

The term "lanyard" may have its ordinary meaning as a piece of rope or line for fastening something; a cord or elongated strap to hold something, or a strong line used to activate a system.

The term "passive" is used herein to refer to an element or component that does not require an external power source to function (i.e., the element or component does not draw energy from a source external to the user).

The term "seal means" is used herein to refer to an element or component of the prosthetic liner that extends from the liner profile and engages with an interior wall of the prosthetic socket. The seal means may be integrally formed with the prosthetic liner.

BRIEF DESCRIPTION OF THE DRAWINGS

These and other features, aspects, and advantages of the present disclosure will become better understood regarding the following description, appended claims, and accompanying drawings.

FIG. 1 is a perspective view of an embodiment of a prosthetic attachment system and corresponding lock assembly according to the disclosure.

FIG. 9A is a sectional view of a latch assembly in FIG. 8 taken along lines IX-IX.

FIG. 9B is a perspective view of a latch assembly in the embodiment of FIG. 8.

FIG. 9C is a transparent rear plan view of the latch assembly of FIG. 8.

Figure 2A:
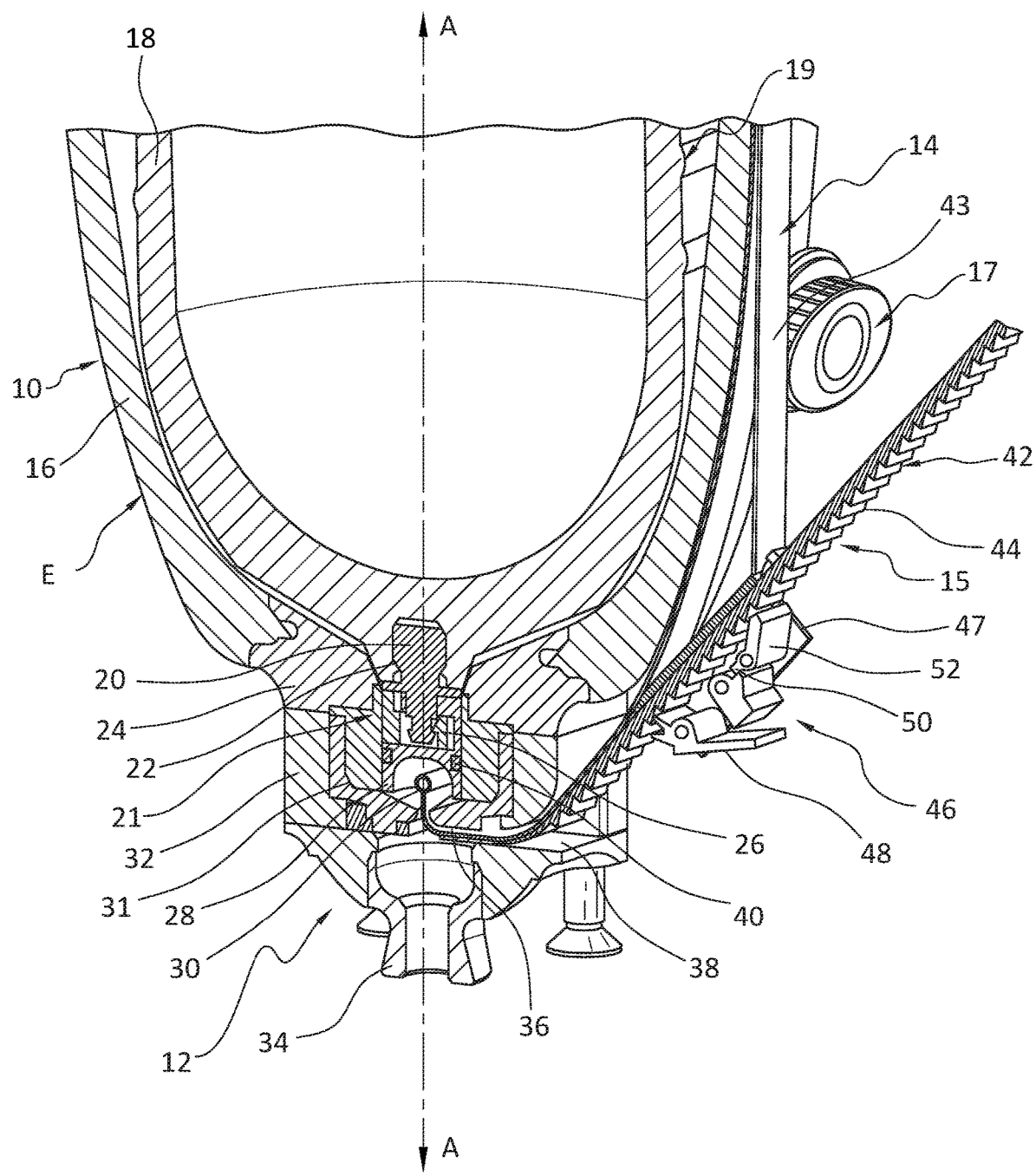
FIG. 2A is a sectional view of the embodiment of FIG. 1 taken along line IIA-IIA.

The drawing figures are not necessarily drawn to scale but instead are drawn to understand the components better and are not intended to be limiting in scope but to provide exemplary illustrations. The figures illustrate exemplary configurations of prosthetic attachment systems, including lock assemblies, and in no way limit the structures or configurations of a prosthetic attachment system and components thereof, including prosthetic attachment systems and corresponding lock assemblies according to the present disclosure.

DETAILED DESCRIPTION OF VARIOUS EMBODIMENTS

A better understanding of different embodiments of the disclosure may be had from the following description read with the accompanying drawings in which reference characters refer to like elements.

While the disclosure is susceptible to various modifications and alternative constructions, certain illustrative embodiments are in the drawings and are described below. It should be understood. However, there is no intention to limit the disclosure to the specific embodiments disclosed, on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning.

Embodiments of the present disclosure advantageously provide a prosthetic attachment system and corresponding lock assembly that facilitates a more intuitive and secure connection between a residual limb and a prosthetic socket.

The prosthetic socket is where the stump of the amputated limb fits into place, thus turning the socket into the point of integration between the human tissue and the replacement prosthetic limb. The prosthetic socket allows the residual limb to connect to the other prosthetic components like the elbow, hand, knee, or foot (and vice versa) depending on the level of amputation. Also known as an "interface," a prosthetic socket provides a surface for weight-bearing, additional support while walking, and assists in the overall control of the other prosthetic components. If the socket is fitted poorly, it can lead to complications, including ongoing pain, sores, or even blisters on the residual limb. The socket may be rigid and capable of being sealed or creating a hypobaric chamber once donned on a limb, with a valve to expel air from the socket.

Most prosthetic sockets are combined with an additional layer called a "prosthetic liner" or sleeve that provides supplementary cushioning and comfort while also helping to provide a more appropriate fit. There are three primary categories of prosthetic liners to choose from: thermoplastic elastomer (TPE) liners, urethane liners, and silicone.

FIG. 1 illustrates a prosthetic socket system 10 according to an embodiment, including a prosthetic socket 16, a prosthetic liner 18, and a lock assembly 12. The lock assembly 12 may be provided as a kit of components arranged to be used interchangeably or as individual components forming part of the prosthetic socket 16 or the prosthetic liner 18. The lock assembly 12 is adapted to secure the prosthetic liner 18 to the prosthetic socket 16.

An exemplary prosthetic liner can be found in U.S. Pat. No. 4,923,474, granted May 8, 1990, U.S. Pat. No. 6,136,039, granted Oct. 24, 2000, and U.S. Pat. No. 6,485,776, granted Nov. 26, 2002, each of which is incorporated by reference in its entirety. The preceding references are merely exemplary, and the liner may have any suitable construction, composition, or configuration.

The prosthetic liner 18 is configured to be donned on a residual limb and positioned in the prosthetic socket 16. Typical liners are made of soft and stretchable material and protect the residual limb and act as an interface between the prosthetic socket 16 and the skin of the residual limb. The prosthetic liner 18 generally includes a liner body having a proximal end, which is open, and a distal end, which is closed. The liner body defines an inner surface that interfaces with the skin and an outer surface opposing the inner surface. The liner body can be formed of a polymeric or elastomeric material like silicone, copolymer gel, polyurethane, combinations thereof, or any other suitable material.

FIG. 2A illustrates the lock assembly 12, coupling the distal ends of the prosthetic liner 18 to the distal end of the prosthetic socket 16. The lock assembly 12 includes an attachment pin 20 extending from the distal end of the prosthetic liner 18. A connector assembly 21 is secured to the prosthetic socket 16 distal end and is adapted for receiving and locking to the attachment pin 20. For example, the connector assembly 21 is secured through vacuum suspension when fully engaged but only mechanically secured when an elongate strap 43 has been secured to the exterior of the prosthetic socket 16, by whichever way is used.

As shown in FIG. 2A, the prosthetic socket 16 may include a valve 17 to expel air from the interior of the prosthetic socket 16, as in conventional sockets. The prosthetic liner 18 may include seal means, as in sealing rings 19. Vacuum suspension systems reduce residual limb volume fluctuations and allow for increased proprioception and reduced pistoning since there is a better attachment between the prosthetic socket and the residual limb. It may also be beneficial to produce hypobaric pressure below a certain level in the prosthetic socket. This pressure may be achieved using a sealing membrane or seal component between the residual limb and the prosthetic socket instead of the conventional sealing method of using a sleeve to form an airtight connection between the residual limb and the proximal end of the socket. The sealing membrane increases the surface area in contact with the socket and creates continuous internal suction inside the socket. The sealing membrane may be on a prosthetic liner as described in U.S. Pat. No. 8,034,120, granted Oct. 11, 2011, incorporated by reference and belonging to the assignee of this disclosure.

A lanyard assembly 15 has a first end secured to the connector assembly 21 and a second end extending outwardly from the distal end of the prosthetic socket 16 and adapted to secure to an exterior surface E of the prosthetic socket 16 by an external securing system 14. The lanyard assembly 15 is fixed to a lock body 32 mounted to the distal end D of the prosthetic socket 16.

The lanyard assembly 15 advantageously allows a user to exert significant leverage in aligning and securing the prosthetic liner 18 to the prosthetic socket 16, particularly while standing up. In addition, the external securing system 14 advantageously secures the exterior side of the prosthetic socket 16, and maybe locationally adapted on the exterior side of the prosthetic socket 16 (proximal and distal directions) according to the user's needs, and enables the user to adeptly secure the lanyard assembly 15 to a requisite degree of tension.

The attachment pin 20 and the pin connector assembly 21 are coaxial along axis A-A of the prosthetic socket system 10, and their configuration is adapted for easy alignment relative to one another. A lock body 32 is mounted to the distal end D of the prosthetic socket 16, and the connector assembly 21 is retained by the lock body 32, particularly by a pin housing 31 located within the lock body 32. Thus, a distal connector 24 may be integrated with the prosthetic socket 16 onto or into which the pin housing 31 and lock body 32 are removably secured.

The prosthetic liner 18 forms a proximal connection 22, to which a proximal end of the attachment pin 20 secures. The attachment pin 20 may have a threaded proximal end, as in conventional attachment pins, which can be secured into a corresponding pin enclosure formed by a distal end of the prosthetic liner 18. In addition, the attachment pin 20 may be secured by other suitable means into the distal end of the prosthetic liner 18, such as by molding or other means.

The attachment pin 20 and the connector assembly 21 preferably form a latch connection 26 located distally from the proximal connection 22. The lock body 32 defines a channel 36 through which a ratchet strap 41 extends from the connector assembly 21 to the exterior of the prosthetic socket 16. The connector assembly 21 forms a mount housing 28 located distally from the latch connection 26. A mount 30 is provided in the mount housing 28 to which the first end of the lanyard assembly 15 secures and communicates through the channel 36 to permit extension of the lanyard assembly 15 therethrough. An adapter 34 may be secured to a distal end of the lock body 32. A seal 40 is secured to the connector assembly 21 and protrudes from the connector assembly 21 to engage the lock body 32.

Figure 2B:
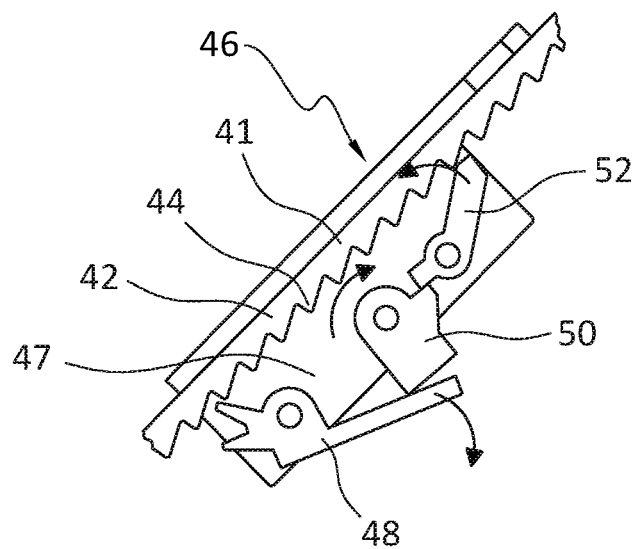
FIG. 2B is an exemplary view of the buckle assembly of FIG. 2A engaging the strap according to the arrows shown therein.
Figure 2C:
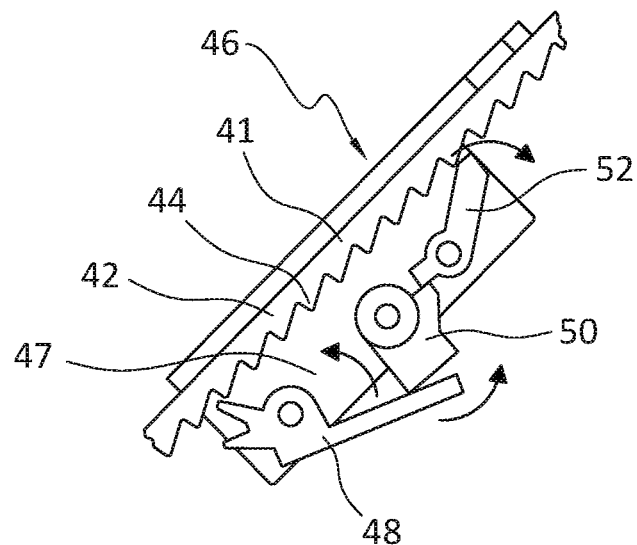
FIG. 2C is an exemplary view of the buckle assembly of FIG. 2A for releasing the strap according to the arrows shown therein.

As exemplified in more detail in FIGS. 2B and 2C, a buckle assembly 46 is arranged to engage the lanyard assembly 15. According to the depicted embodiment of FIGS. 2A-2C, the lanyard assembly 15 defines a ratchet strap 41 having a gripping portion 42 formed by at least two teeth 44. The buckle assembly 46 defines a tensioning lever 48 engaging at least one tooth of the at least two teeth 44; the tensioning lever 48 is biased toward the at least two teeth 44. FIG. 2B exemplifies how the buckle assembly 46 engages the ratchet strap 41, and FIG. 2C exemplifies how the buckle assembly 46 releases from the ratchet strap 41.

The buckle assembly 46 may include a locking lever 52 counteracting the tensioning lever 48 and engaging at least one tooth of the at least two teeth 44. In addition, the buckle assembly 46 has a release lever 50 and a locking lever 52. The buckle assembly 46 includes a frame 47 on which the tensioning lever 48, release lever 50, and the locking lever 52 cooperatively rotate.

An elongate strap 43 is coupled to the mount 30 in the mount housing 28 at the first end of the lanyard assembly 15 and extends through the channel 36 to a bracket 54 of the external securing system 14. The elongated strap extends from the bracket 54 to the buckle assembly 46. The lanyard assembly 15 is located proximally along with the exterior surface E of the prosthetic socket 16 relative to the buckle assembly 46. The ratchet strap 41 enables tensioning of the elongate strap 43 between the buckle assembly 46 and the bracket 54. By activating the tensioning lever 48, the tensioning lever engages with the at least two teeth 44 of the ratchet strap 41 causing the ratchet strap 41 to be pushed through the buckle assembly 46, resulting in an increase in tension in the elongate strap 43. Conversely, by activating the release lever 50, the ratchet strap 41 retreats through the buckle assembly 46, reducing tension in the elongate strap 43.

Figure 3:
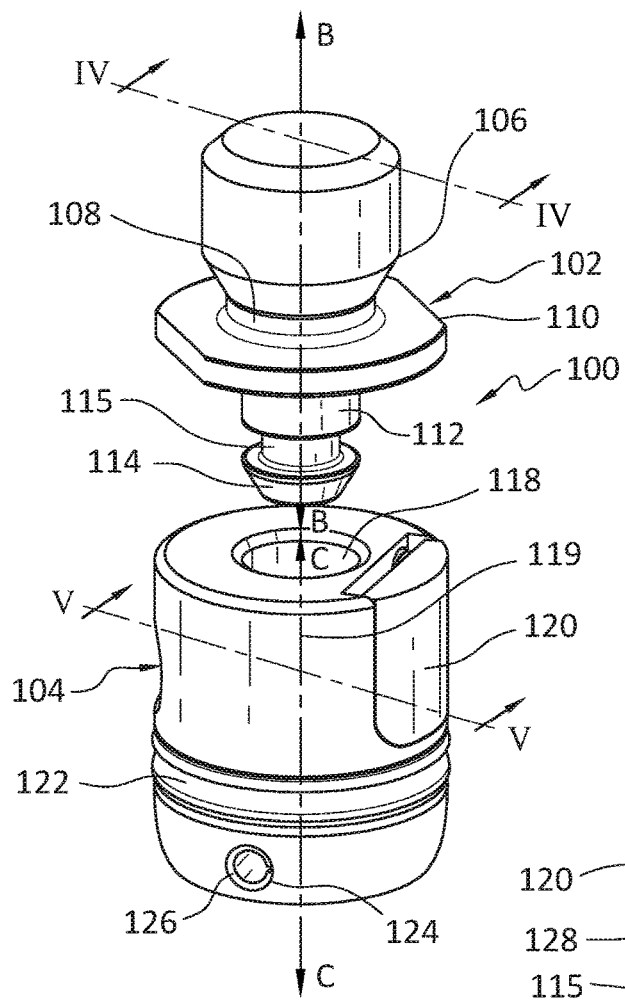
FIG. 3 is an exploded view of an embodiment of a connector assembly in FIG. 2A.
Figure 4:
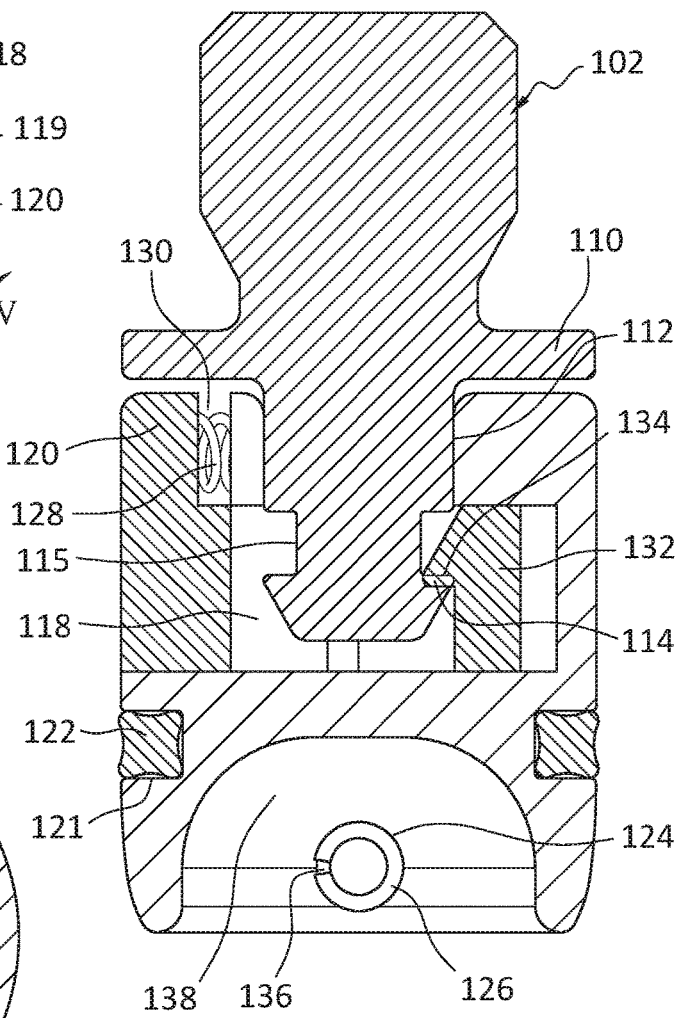
FIG. 4 is a sectional view of the embodiment of FIG. 3 in an assembled condition and taken along lines IV-IV.
Figure 5:
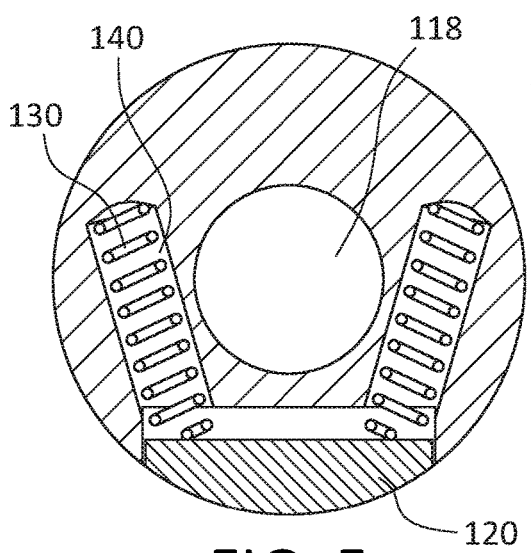
FIG. 5 is a sectional view of the embodiment of FIG. 3 taken along lines V-V.
Figure 4A:
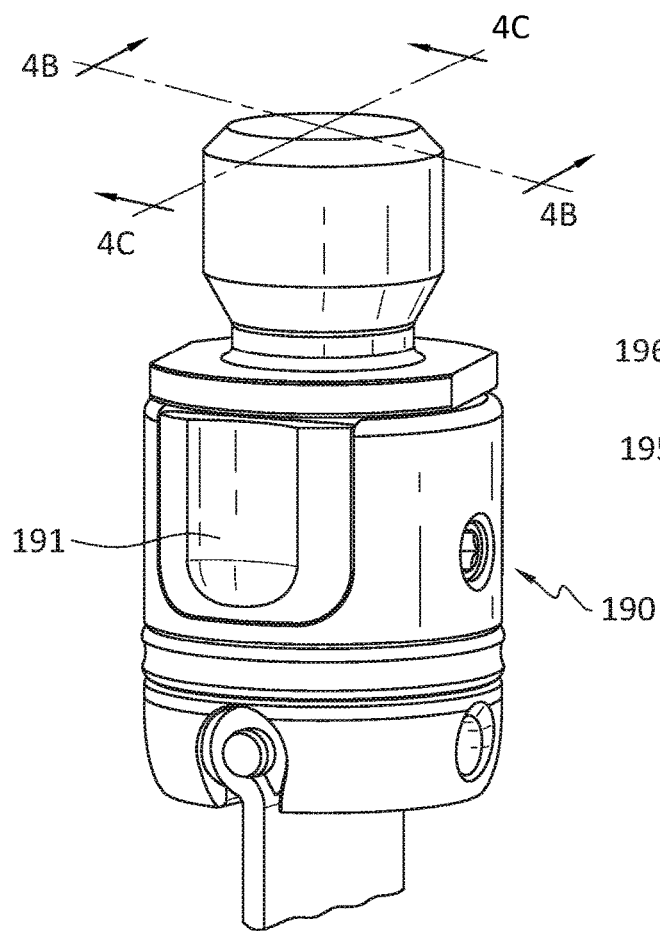
FIG. 4A is an alternative embodiment of the connector of FIG. 3.
Figure 4B:
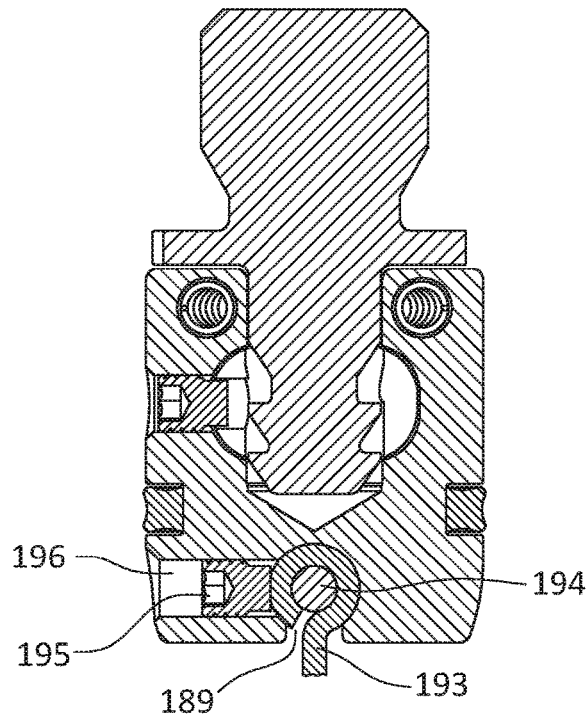
FIG. 4B is a cross-sectional view taken along lines 4B-4B in FIG. 4A.
Figure 4C:
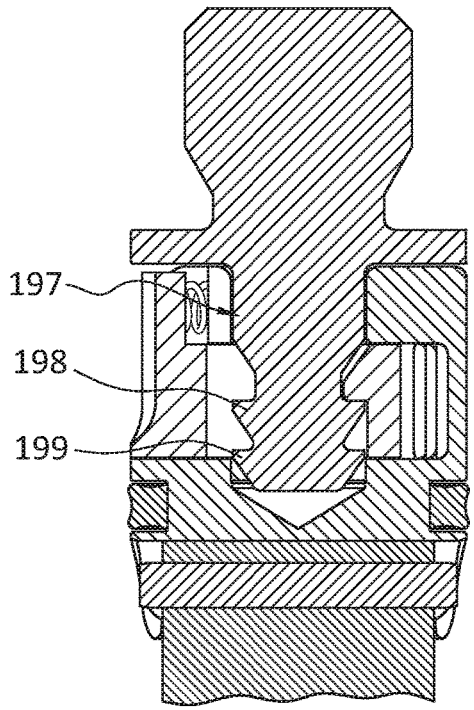
FIG. 4C is a cross-sectional view taken along lines 4C-4C in FIG. 4A.

According to the embodiment of FIGS. 3-5, the connector assembly 100 is illustrated and adapted to function as described above to secure a prosthetic liner 18 to a prosthetic socket 16. The connector assembly 100 has a pin 102 arranged to secure the distal end of a prosthetic liner 18, and a receptacle 104 has a receptacle body 116 and a receiving opening to receive and secure the pin 102. The pin 102 and the receptacle 104 are arranged to secure the distal end of the prosthetic liner 18 to the distal end of the prosthetic socket 16 when the assembly is fully engaged into the pin housing 31, and the elongate strap 43 is secured to the exterior of the prosthetic socket 16 in any of the arrangements described herein. The receptacle 104 has a connector assembly 100 removably securing to the pin 102.

In this embodiment, the pin 102 defines a mount 106 on a proximal end adapted to be received by a prosthetic liner 18, a seat flange 110 radially protruding from an axis B-B of the pin 102, and locking flange 114 at a distal end of the pin 102. The pin 102 defines a proximal tapering portion 108 between the mount 106 to the seat flange 110. The seat flange 110 radially extends beyond the mount 106. The pin 102 defines a shank 112 extending distally from the seat flange 110 along the axis B-B.

The shank 112 forms a locking portion 115, defined as a radially recessed portion relative to a portion of the shank 112 thereabove. The locking flange 114 extends distally from the locking portion 115. A proximal end of the locking flange 114 has a diameter generally the same as the diameter of the shank 112 above the locking portion 115. Thus, the locking flange 114 forms a conical profile extending from the proximal end and tapering to the distal end.

The receptacle 104 forms a receiving opening 118 configured and dimensioned to receive the pin 102 from the shank 112 to the locking flange 114. The seat flange 110 has a diameter greater than the receiving opening 118. The receiving opening 118 and the pin 102 are arranged to be coaxial along their respective longitudinal axes B-B, C-C. The receptacle 104 forms a top surface 119 arranged for abutment with the seat flange 110 and restricts the travel of the distal end of the pin 102 in the receptacle 104.

The receptacle 104 has a release button 120 arranged for releasing the engagement of the receptacle 104 to the pin 102. The receptacle 104 includes a radially protruding seal 122 for engagement with the prosthetic socket 16. The receptacle 104 forms an exterior circumferential groove 121 configured and dimensioned for receiving the radially protruding seal 122. The receptacle 104 forms a mount 126 disposed at the distal end of the receptacle 104. The mount 126 is adapted to receive an end of an elongate element.

The receptacle 104 forms a channel 124 generally extending perpendicularly relative to the axis C-C of the receptacle at a distal end thereof. The mount 126 forms an aperture 136 configured and dimensioned for receiving an end of the elongate element. The mount 126 may be configured as a conventional spring pin, arranged as shown. The receptacle 104 forms a cavity 138 at the distal end thereof, permitting articulation of the elongate element therein. The receptacle 104 includes a locking mechanism for selectively engaging the pin 102. The locking mechanism includes a latch 132 spring-biased toward the axis C-C. The latch 132 is coupled to at least one spring 128, generally extending perpendicularly relative to the axis C-C. The term "generally is meant to connote "mostly" or "near exactly," but not necessarily exactly. The spring 128 is biased between an internal channel 140 formed by the receptacle 104 and a release button 120.

The release button 120 is arranged to articulate within a space 130, permitting depression, and in turn, disengages or pivots the latch 132 away from locking flange 114 of the pin 102. The latch 132 has a detent 134 engageable with the locking flange 114.

FIGS. 4 and 4A-4C exemplify a variation of the connector assembly 100, as denoted by as connector 190. In the connector 190, the release button has a groove 191 to provide haptic feedback, particularly when a user or clinician cannot see the release button. The lanyard 193 extends into a hole 189 located at the bottom of the connector 190 and is secured about a dowel pin 194. The lanyard 193 extends about the dowel pin 194 and is engaged by a set screw 195 extending in a cylindrical opening 196 along a side of the connector 190. The end of the lanyard 193 secured about the dowel pin 194 may be thicker, such as by being heated and shaped after the lanyard is cut to length to provide a stronger connection to the connector 190. The shank 197 may include at least two notches, 198, and 199, so the lower notch is intended for the user to retrieve the connector if the lanyard is stuck in a lowermost position. The at least two notches, 198, and 199 enables a ratcheting arrangement with the detent flange.

Figure 6:
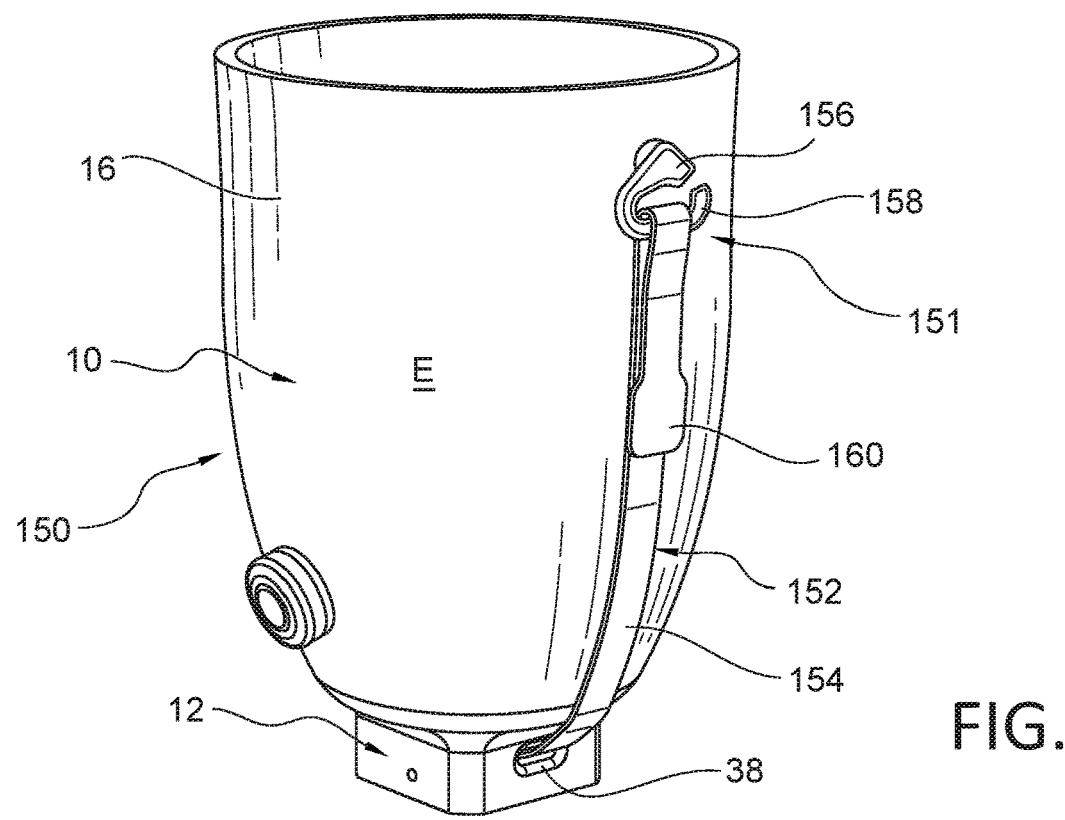
FIG. 6 is a perspective view of another embodiment of a prosthetic attachment system and corresponding lock assembly.

FIG. 6 illustrates another embodiment of a strap connection for a prosthetic socket system 150 adapted to secure a prosthetic liner 18 to a prosthetic socket 16. The strap connection includes an attachment pin 20 extending from a distal end of the prosthetic liner 18. As in other embodiments, a lock assembly 12 is secured by a distal end of the prosthetic socket 16 and is adapted for receiving and locking to the attachment pin 20. It follows that when the pin engages the lock housing, it provides vacuum locking. Mechanical locking is created when the elongate element 154 extends from the receptacle 104 secures to the exterior surface E of the prosthetic socket 16.

A strap assembly 152 has a first end secured to the lock assembly 12 and a second end extending outwardly from the distal end of the prosthetic socket 16 and adapted to secure to an exterior surface E of the prosthetic socket 16 by an external securing system 151. The elongate element 154 is secured to the receptacle 104, securing the attachment pin 20 from the prosthetic liner 18. The lock assembly 12 defines an outlet 38 for an elongate element 154 of the strap assembly 152, and the strap assembly 152 is biased about a bracket 156 having a hook 158.

The elongate element 154 may be a hook receivable strap. A second end of the elongate element 154 may include a tab 160 with a plurality of hooks for engaging the elongate element 154. The arrangement enables a user to tension the elongate element 154 about the hook 158 and releasably secure to tab 160 the surface of the elongate element 154 to tension the strap accordingly. Of course, the elongate element 154 can be arranged in any known manner to assure the strap secures to itself, and the hook 158 and hook connection can be variably arranged to secure to one another.

Figure 7:
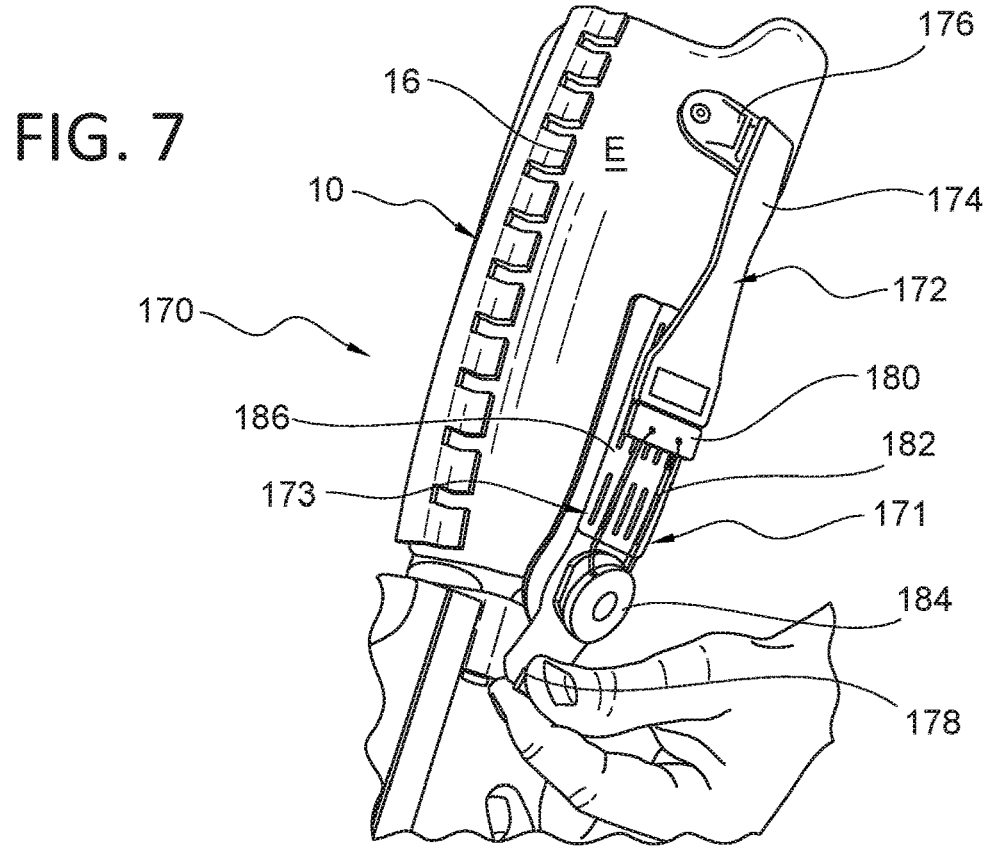
FIG. 7 is a perspective view of another embodiment of a prosthetic attachment system and corresponding lock assembly.

FIG. 7 depicts yet another strap connection for a prosthetic socket system 170. The attachment pin 20 and lock assembly may be as in the preceding embodiments. The strap assembly 172 has a first end secured to the lock assembly 12 via the connector assembly 100 and a second end extending outwardly from the distal end of the prosthetic socket 16 and adapted to secure to an exterior surface E of the prosthetic socket 16 by an external securing system 171. The strap assembly 172 includes an elongate element 174 extending from the lock assembly 12 and biased about a bracket 178 at the first end and a D-ring 176 at the second end. A tensioning device 173 is attached to an end of the elongate element 174 and coupled to a distal end of the prosthetic socket 16 by a bracket 178. The tensioning device 173 includes a tab 180 connecting a cable 182 to a dial tensioning device 184 along with a plate 186. The D-ring 176 is fixedly attached at the proximal end of the exterior surface of the prosthetic socket 16.

The dial tensioning device 184 may be similarly arranged as taught in U.S. Pat. No. 10,537,458, granted Jan. 21, 2020, and incorporated herein by reference.

Figure 8:
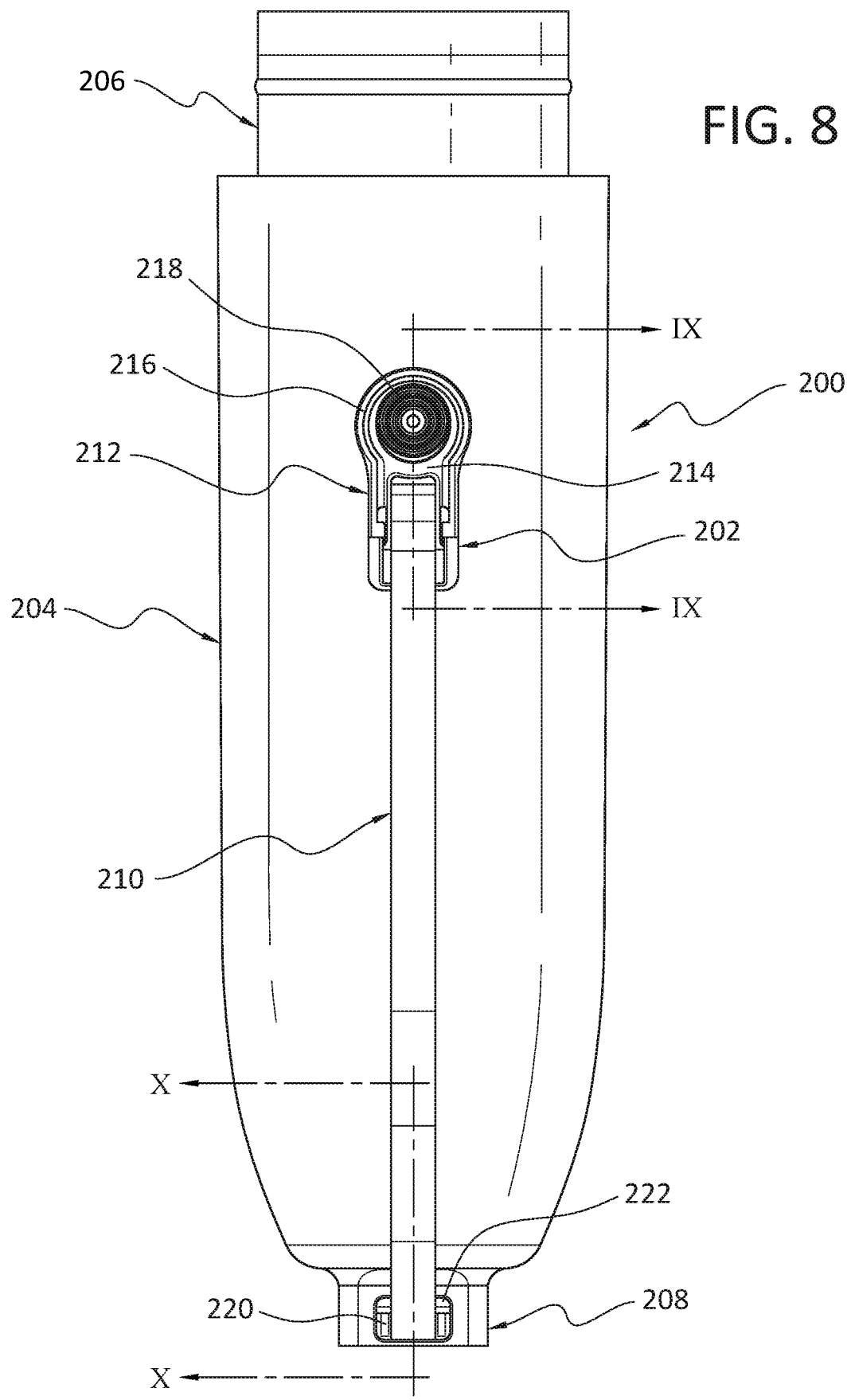
FIG. 8 is a perspective view of another embodiment of a prosthetic attachment system and corresponding lock assembly according to the disclosure.

FIG. 8 illustrates another prosthetic socket system 200 according to an embodiment, including a prosthetic socket 204, a prosthetic liner 206, and a lanyard locking system 202. As with the embodiment of FIG. 1, the lanyard locking system 202 may be provided as a kit of interchangeable components or as individual components forming part of the prosthetic socket 16 or the prosthetic liner 18. The lock assembly 12 is adapted to secure the prosthetic liner 206 to the prosthetic socket 204 via an attachment pin 20.

A mounting block 208 is secured to a distal end of the prosthetic socket 204, from which extends a lanyard strap 210. A latch assembly 212 is located on the prosthetic socket 204 proximally from the distal end and proximate to a proximal end of the prosthetic socket 204, although any location proximate to the mounting block 208 may be sufficient. A distal end of the lanyard strap 210 may carry a lever 214 that engages the latch assembly 212 and secures therewith in a secured configuration.

The latch assembly 212 includes a base 216 secured against the exterior wall of the prosthetic socket 204. The lever 214 rests within the base 216 and is actuated in engagement and disengagement with the base 216 by a button 218.

The lanyard strap 210 may be elastic or inelastic. A first distal end of the lanyard strap 210 is coupled to the connector assembly 100 of FIGS. 3 and 4, which are mounted onto the mounting block 208. The mounting block 208 has a first diverter 220 from which the lanyard strap 210 extends from the connector assembly and out of the mounting block 208. A second distal end of the lanyard strap 210 may secure to a retainer 222 extending from the mounting block 208.

FIGS. 9A-9C illustrate the latch assembly 212. The latch assembly 212 includes a mounting plate 224 that may be embedded into the wall 205 of the prosthetic socket 204. In addition, the mounting plate 224 may define a flanged periphery 225 including a plurality of openings 226 so that the material of the prosthetic socket 204, as it is formed, can interlock with the mounting plate 224.

The mounting plate 224 may define the base 216 configured and dimensioned to receive the lever 214. The base 216 forms bolsters 234 each of which defines a recess 236 into which a pin 238 of the lever 214 can slide into and permit the lever to engage and rotate relative to the base 216.

The latch assembly 212 includes a button 218 about which an opening 239 of the lever 214 releasably secures. The button 218 has a central connection 240 to the base 216. The central connection 240, as shown in FIG. 9C, includes a part 242 engaging the button 218 and is movably biased relative to a base part 244 by springs 246. By sliding the button in a direction A downwardly, the button 218 can disengage from the lever 214 within a clearance 250 permitting the button 218 to separate from the lever 214. Conversely, when the lever 214 is placed about the button 218 to engage therewith, the spring bias maintains the lever 214 and the button 218 together in a secured relationship.

The lever 214 includes a retainer 228 about which the lanyard strap 210 may be mounted, as shown in FIG. 9A. The lever 214 forms an opening 230 in which the lanyard strap 210 extends and a diverting surface 232 to project the lanyard strap 210 away from the base 216. The retainer 228 may include a pin and a roller, in that the roller reduces friction in the lanyard when pulling on the lever.

Figure 9D:
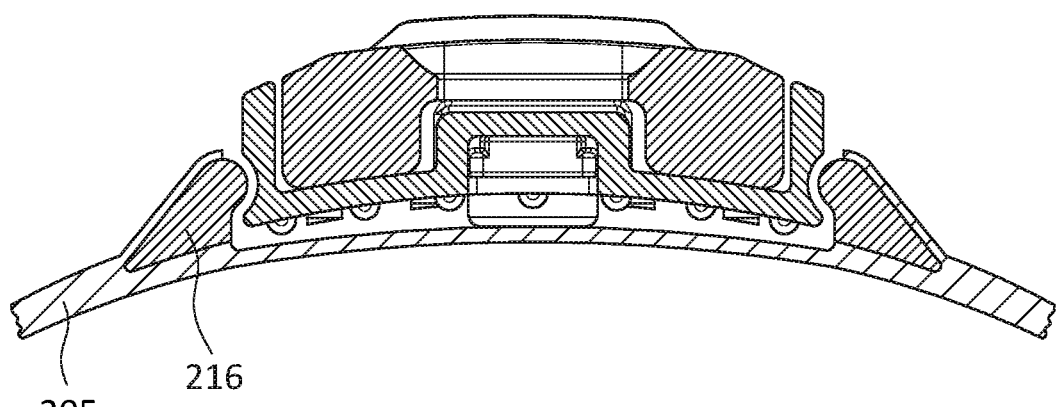
FIG. 9D is another perspective view of the latch assembly in FIG. 9A.
Figure 10A:
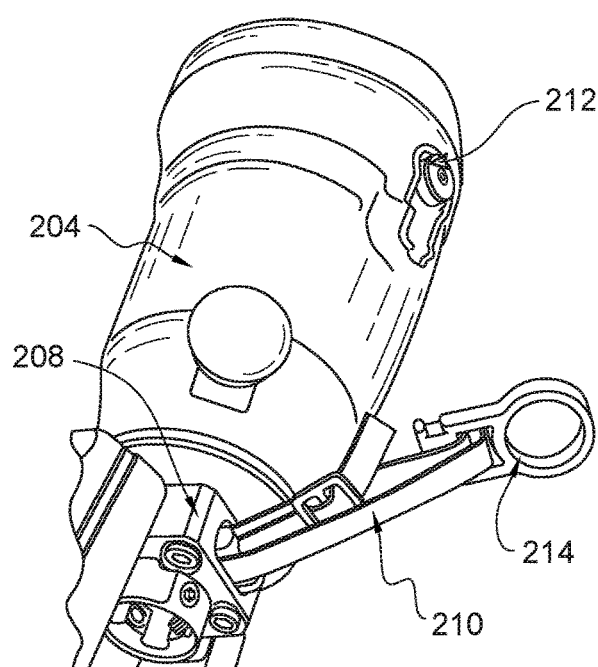
FIGS. 10A-10D are schematic views exemplifying the engagement and disengagement of the lanyard assembly to the latch assembly.
Figure 10B:
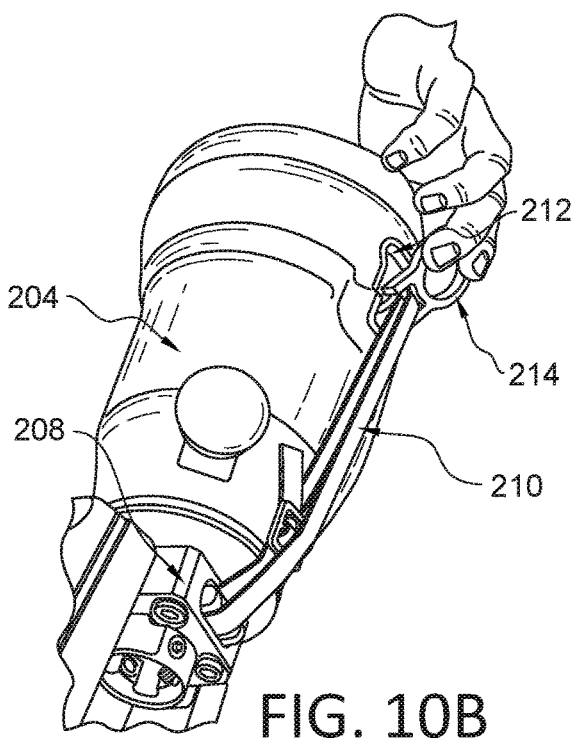
Figure 10C:
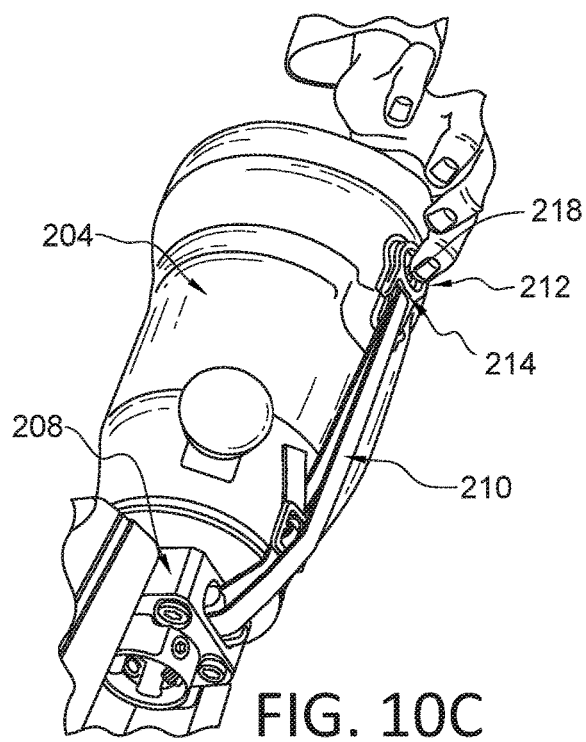
Figure 10D:
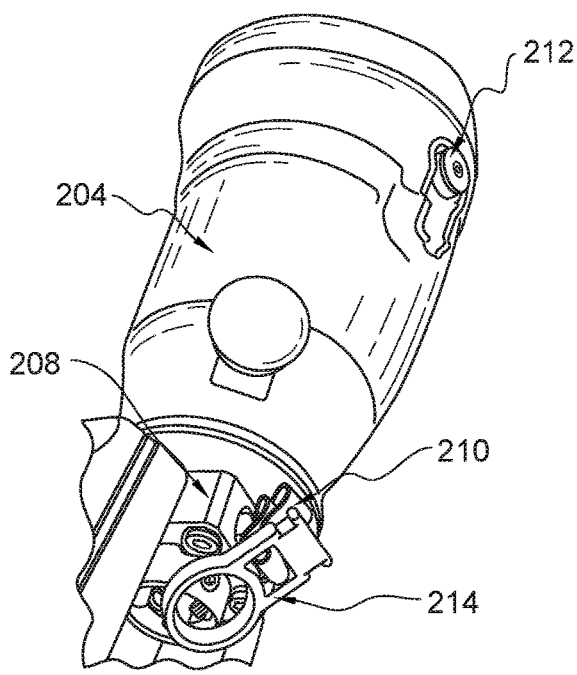

FIG. 9D exemplifies how the base 216 is embedded in the wall 205 of the socket.

FIGS. 10A-10D illustrate engagement and disengagement of the lever with the button, as referenced above.

Figure 11A:
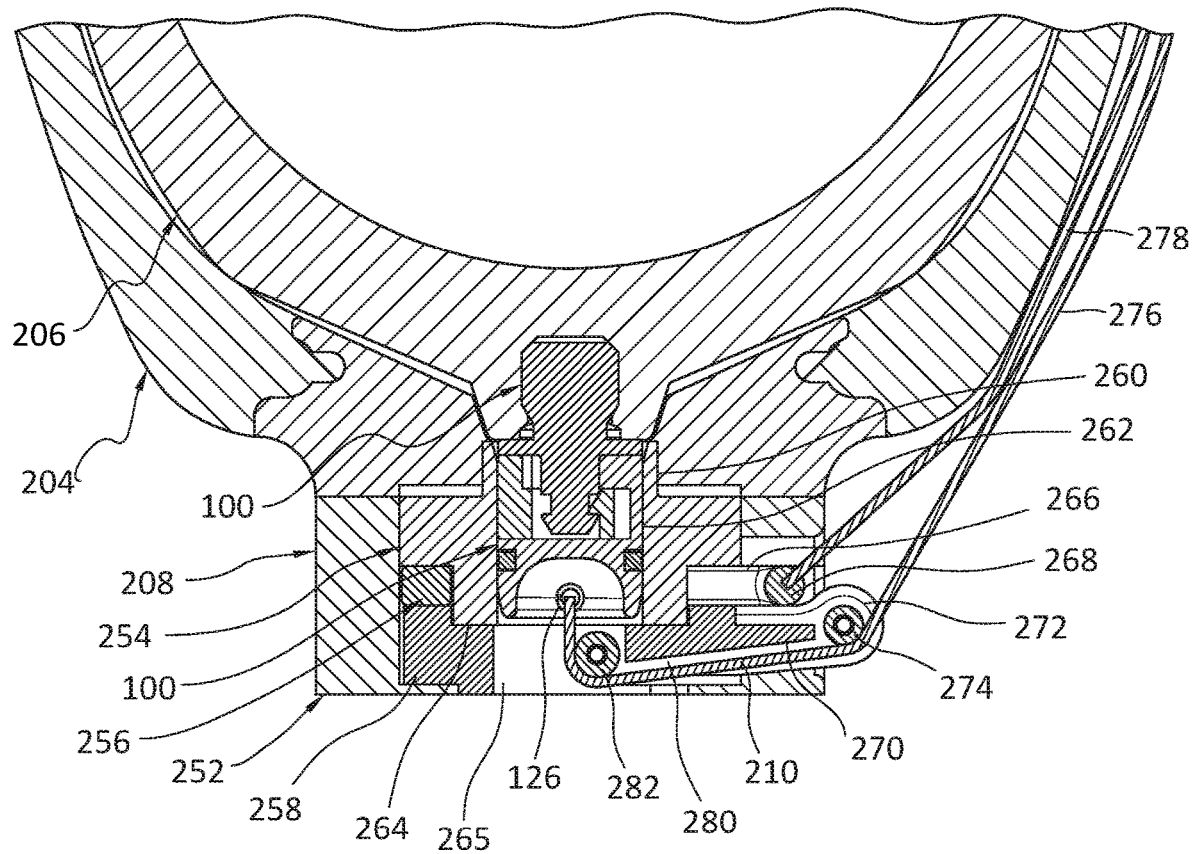
FIG. 11A is a sectional view of a distal end of the prosthetic attachment system in FIG. 8 taken along lines X-X.
Figure 11B:
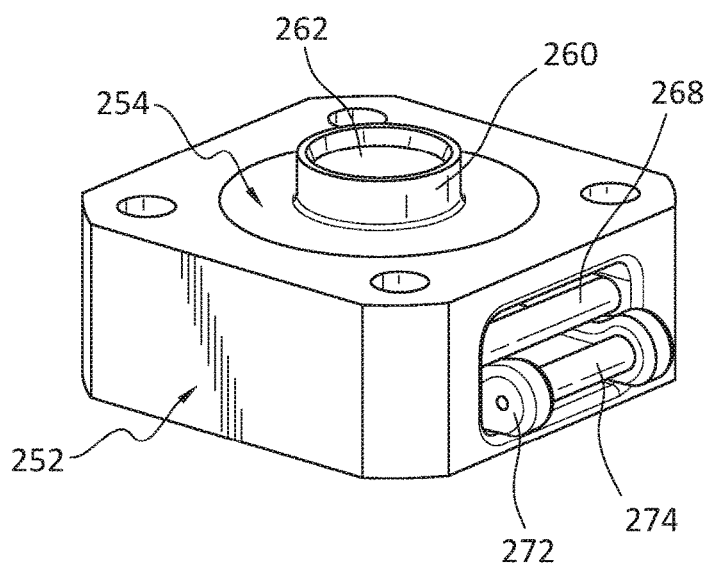
FIG. 11B is a perspective view of a mounting block in the prosthetic attachment system of FIG. 8.

FIGS. 11A and 11B illustrate the distal end of the prosthetic socket system 200 of FIG. 8. The connector assembly 100 is adapted to extend into the mounting block 208. The mounting block 208 may include an outer block 252 surrounding an upper part 254, a lower part 258, and a middle ring 256 extending about at least the upper part 254. The upper part 254 defines a proximal projection 260, including an opening 262 through which the connector assembly 100 extends. A distal portion 264 is received by a corresponding proximal portion 265 of the lower part 258. The lower part 258 forms an opening 280, including a first diverter 282 located within the opening 280. The lanyard strap 210 feeds through the opening 280 and is routed about the first diverter 282 along a biasing portion 270 toward a second diverter 274 carried by an extension 272 extending outwardly from the lower part 258.

The lanyard strap 210 extending from the lower part 258 can be considered a first segment 276 extending toward the lever (not shown), and a second segment 278 is routed about the lever to the middle ring 256. The middle ring 256 has a tongue 266 projecting a retainer 268 for receiving an end of the second segment 278 of the lanyard strap 210.

Figure 11C:
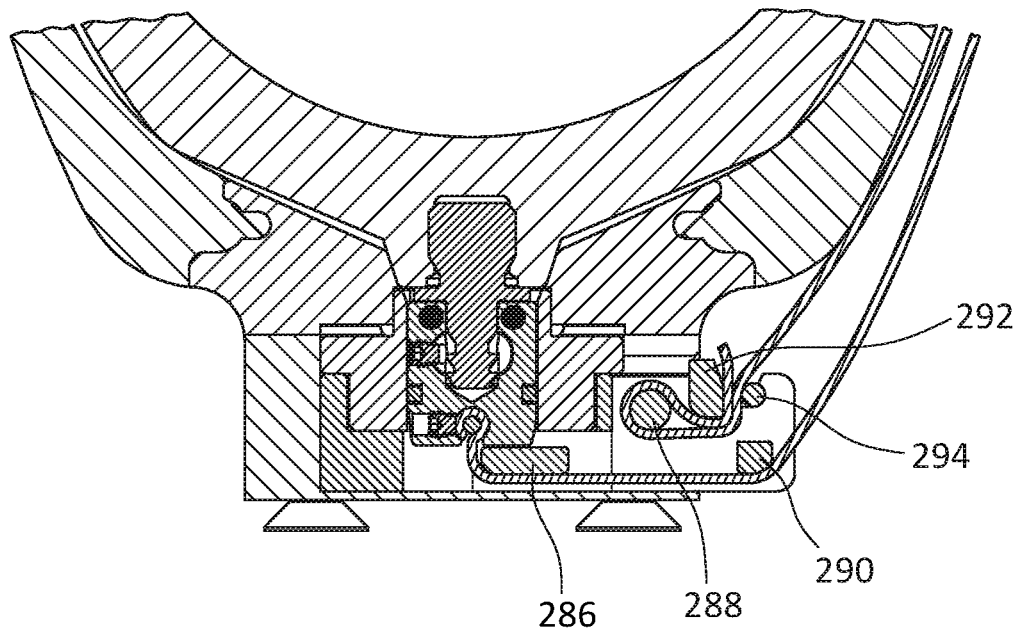
FIG. 11C is a cross-sectional view of a variation of the distal end of the prosthetic attachment system.

FIG. 11C exemplifies a simpler version of the mounting block at the distal end of the prosthetic attachment system. The mounting block offers a series of rollers 286, 288, 290, 292, 294 about which the lanyard is biased.

Figure 11D:
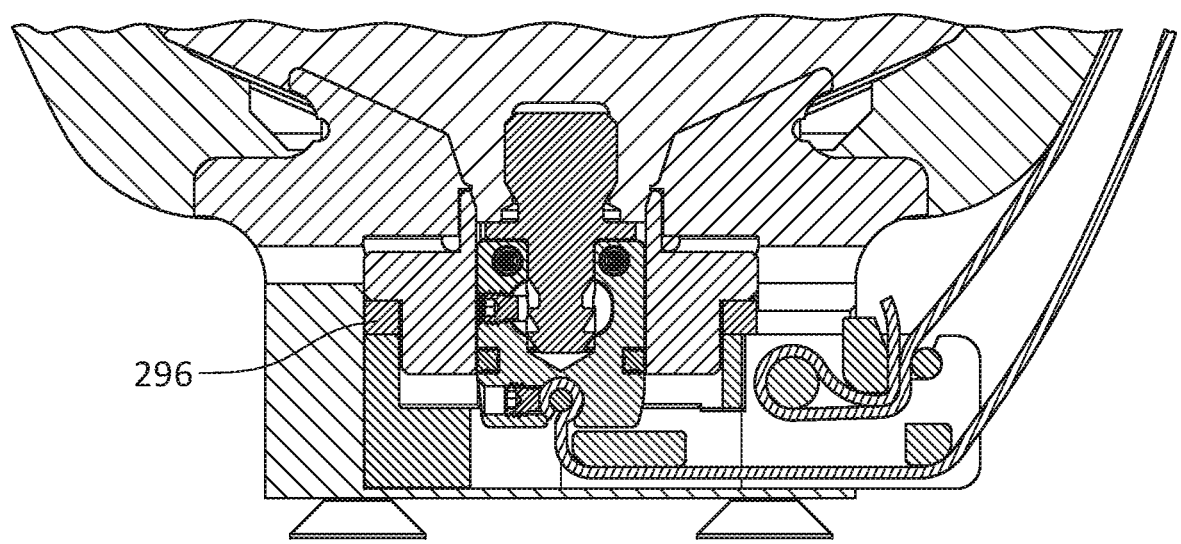
FIG. 11D is a cross-sectional view of another variation of the distal end of the prosthetic attachment system.

FIG. 11D exemplifies how a gap piece 296 can be inserted in the distal attachment depending on the socket size.

Figure 11E:
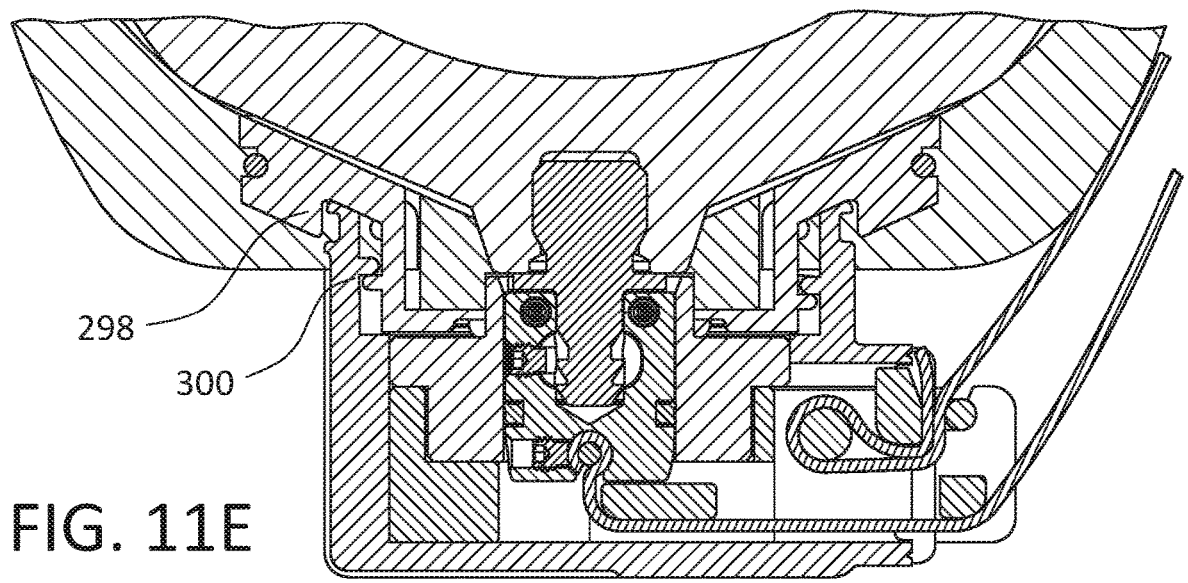
FIG. 11E is a perspective view showing an embodiment of a mounting block with a funnel nut.

FIG. 11E shows another embodiment, including a funnel nut 298 retained by a frame 300 in a mounting block.

Figure 12:
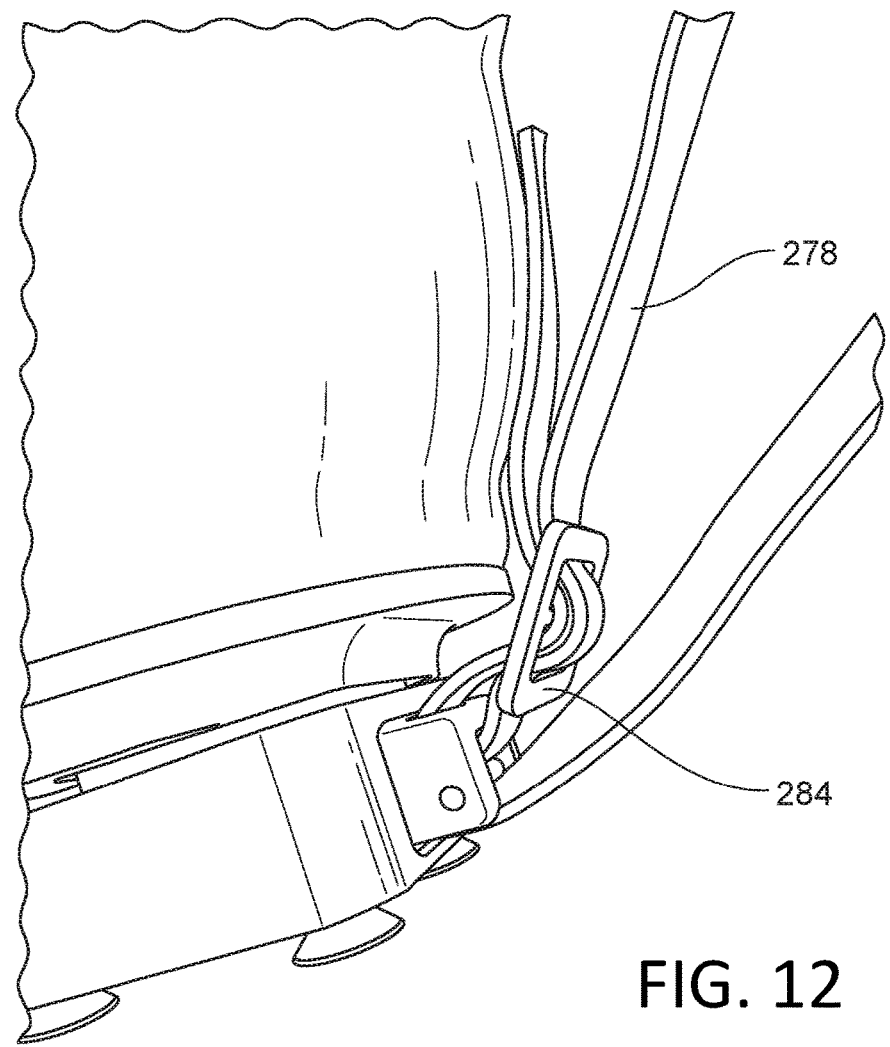
FIG. 12 is a cross-sectional view of yet another variation of the distal end of the prosthetic attachment system.

As shown in FIG. 12, the retainer 268 may be used to loop the lanyard and then fix the lanyard with a multiple bar buckle 284. This makes the lanyard length easily adjustable and not permanently fixed in length.

Although this disclosure describes certain exemplary embodiments and examples of a prosthetic socket system, including a lock assembly, it nevertheless will be understood by those skilled in the art that the present disclosure extends beyond the specifically disclosed prosthetic socket and prosthetic attachment system embodiments to other alternative embodiments and/or users of the disclosure and obvious modifications and equivalents thereof. It is intended that the scope of the present disclosure should not be limited by the particular disclosed embodiments described above, and may be extended to prosthetic devices and supports, and other applications that may employ the features described herein.

The invention claimed is:

1. A lock assembly for a prosthetic socket system adapted to secure a prosthetic liner to a prosthetic socket, the lock assembly comprising:

an attachment pin arranged to extend from a distal end of the prosthetic liner;

a connector assembly secured by a distal end of the prosthetic socket, and adapted for receiving and locking to the attachment pin;

a lanyard assembly having a first end secured to the connector assembly and a second end extending outwardly from the distal end of the socket and adapted to secure to an exterior surface of the prosthetic socket by an external securing system.

2. The lock assembly of claim 1, wherein the attachment pin and the connector assembly are coaxial along an axis of the prosthetic socket system.

3. The lock assembly of claim 1, further comprising a lock body mounted to the distal end of the prosthetic socket, the connector assembly being retained by the lock body.

4. The lock assembly of claim 3, wherein the prosthetic socket includes a distal connector onto which the lock body is removably secured.

5. The lock assembly of claim 3, wherein the lock body defines a channel through which the lanyard assembly extends from the connector assembly to the exterior of the prosthetic socket.

6. The lock assembly of claim 1, wherein the attachment pin is arranged to extend from a proximal connection of the prosthetic liner, the attachment pin, and the connector assembly form a latch connection located distally from the proximal connection.

7. The lock assembly of claim 6, wherein a lock body defines a channel through which the lanyard assembly extends from the connector assembly to the exterior of the prosthetic socket;

wherein the connector assembly forms a mount housing located distally from the latch connection;

wherein the connector assembly has a mount in the mount housing to which the first end of the lanyard assembly secures and communicates to the channel to permit extension for the lanyard assembly therethrough.

8. The lock assembly of claim 1, wherein the external securing system includes a buckle assembly arranged to engage the lanyard assembly.

9. The lock assembly of claim 8, wherein the lanyard assembly defines a ratchet strap as having a gripping portion formed by at least two teeth.

10. The lock assembly of claim 8, wherein the lanyard assembly defines a ratchet strap having a gripping portion formed by at least two teeth;

wherein the buckle assembly defines a tensioning lever engaging at least one tooth of the at least two teeth, the tensioning lever being biased toward the at least one tooth.

11. The lock assembly of claim 10, wherein the buckle assembly includes a locking lever counteracting the tensioning lever, and engaging at least one tooth of the at least two teeth; and wherein the buckle assembly further includes a release lever engaging both the tensioning lever and the locking lever; the buckle assembly including a frame on which the tensioning lever, release lever and the locking lever cooperatively rotate.

12. The lock assembly of claim 11, wherein the lanyard assembly includes an elongate strap coupled at a first end to the buckle assembly and having a second end secured to a bracket of the exterior securing system, and located proximally along the exterior surface of the prosthetic socket relative to the buckle assembly.

13. A strap connection for a prosthetic socket system adapted to secure a prosthetic liner to a prosthetic socket, comprising:

an attachment pin extending from a distal end of the prosthetic liner;

a lock assembly secured by a distal end of the prosthetic socket, and adapted for receiving and locking to the attachment pin;

a strap assembly having a first end secured to the lock assembly and a second end extending outwardly from the distal end of the prosthetic socket and adapted to secure to an exterior surface of the prosthetic socket by an external securing system.

14. The strap connection of claim 13, wherein the lock assembly defines an outlet for an elongate element of the strap assembly, the elongate element biased about a bracket having a hook.

* * * * *